Patented Mar. 22, 1938

2,112,175

UNITED STATES PATENT OFFICE 2,112,175

PROCESS OF PRODUCING STOCK AND POULTRY FOOD FROM GARBAGE

Henry H. Moreton, Santa Monica, Calif.

No Drawing. Application May 10, 1935,
Serial No. 20,888

2 Claims. (Cl. 99—149)

This invention is a process of producing an edible food product particularly suited for hogs, cattle, poultry and the like.

One of the objects of the invention is to produce a balanced stock and poultry food, which may be readily and economically manufactured from garbage. A further object is to provide a stock and poultry food in which the essential vitamins and the fats contained in the original garbage are retained, but in which said fats have been treated to balance the protein content, and to prevent rancidity, so that the product will not spoil during storage.

The invention will be hereinafter fully set forth and particularly pointed out in the claims.

In treating garbage to produce the product of the invention, any desired apparatus may be used, but it is preferred to employ a steam jacketed chamber equipped with a rotatable mixer or agitator, and so constructed that the interior thereof may be subjected to vacuum when desired. Digesters possessing these general characteristics are so well known in the art that it is considered unnecessary to illustrate the same.

The garbage may be fed to the digester in any desired manner, such for instance as any of the well known continuous feeding systems, a part of which may be used as a belt conveyor and picking table, to facilitate the removal of large bones, pieces of metal and the like.

After the material has been introduced into the treating chamber, a steam jacket pressure of approximately 75 pounds to 80 pounds per square inch is maintained, with a temperature range between 200° F. to 310° F., and an internal pressure within the digester chamber of approximately 40 pounds per square inch, due to the moisture of the garbage. As a result, the material is quickly brought to a soupy state, and initially cooked in its own moisture, for about 45 minutes. Of this last-mentioned period, approximately not more than 15 minutes will show high internal pressure, but this will result in complete sterilization without vitamin destruction, with the exception of vitamin C, which has no value for stock feeding. Complete destruction of all disease spores is effected by the said 15 minutes cooking under steam pressure, particularly if a small percentage of bicarbonate of soda is added to the material before cooking. It is to be understood, therefore, that bicarbonate of soda will be so added whenever necessary, the quantity to be determined by examination of the garbage being treated.

After cooking the garbage for the full period of 45 minutes as stated, the interior of the chamber is placed under vacuum, and while the contents are subjected to the vacuum the cooking is continued for approximately 5¾ hours. Care must be taken not to permit air to come into contact with the material being treated, because admission of air would probably destroy the vitamins or complettins. These last-mentioned constituents will withstand considerable heat and cooking, however, if the air is excluded.

Toward the end of the cooking period under vacuum, the temperature is gradually reduced and the vacuum is also tapered off. After the completion of the cooking stage, and the cooked material has cooled to a temperature below that at which the vitamin content will be affected in the presence of oxygen, it is dumped from the digester and dried in any desired manner, after which it may be ground to any degree of fineness. Before drying and grinding, the large bones, pieces of metal and other foreign non-edible material must be removed in any desirable manner, many methods of performing these functions being well known and understood in the art.

It is proposed to treat the sterilized and cooked garbage thus obtained, so as to reduce its richness as a food, and also to prevent spoiling during storage. For instance, the fat content of the treated garbage will average approximately 14% of the whole mass, which may, under some conditions be excessive in a stock food product. It has also been found that during storage of sacks containing treated material with such a high fat content, particularly if stored ten or twelve deep, the excess fat squeezes out under the weight of the material or becomes heated, and in either event becomes rancid.

To overcome these conditions it is proposed to add to the sterilized and cooked garbage material a substantially non-protein fat-absorbent, such as corn cob meal, alfalfa meal, middlings, and similar substances which permanently absorb the excess fat.

The filler should be added to the mixture while the latter is being cooled in the digester. By so doing, the fats are in a more or less liquid condition and a certain percentage is absorbed by the protein material to such an extent that at the completion of the cooking and cooling of the mass the fat cannot be expressed by the weight of the material during storage. In addition to the foregoing, by the use of the filler, a much quicker drying of the mass is effected because of the greater surface presented to the drying action, and the color of the final product is greatly improved. These characteristics are important, because the vitamin and protein content, as well as color, are determining factors in the sale of such products. While the proportions of non-protein fat-absorbent may be varied, experience has demonstrated that a mixture of approximately 100 pounds of the treated garbage, which would normally contain approximately 14% of fat and 33⅓ pounds of fat-absorbent, such as corn cob meal, produces a desirable food.

The advantages of the invention will be readily understood by those skilled in the art to which it belongs. In this connection it will be particularly noted that a product containing a high protein content is altered to provide a balanced stock and poultry food of greater bulk but equal food value. A further advantage is that the food product may be readily produced from garbage, and that the fatty content is so treated that the product may be stored indefinitely without the fat becoming rancid or otherwise spoiling the product.

Having thus explained the nature of the invention and described an operative manner of constructing and using the same, although without attempting to set forth all of the forms in which it may be made, or all of the forms of its use, what is claimed is:—

1. The method of treating garbage to provide an edible food product comprising cooking garbage in a closed container while retaining the full volume of its normally inherent moisture until the mass is brought to a thick soupy state, sterilizing the mass without substantial vitamin destruction, thoroughly cooking the sterilized mass by subjecting it to heat under vacuum for a substantial period, retaining in the mass the fat constituents normally inherent to the original garbage, cooling the mass without vitamin destruction, and during the cooling stage adding to the mass a low protein fat absorbent material and causing it to absorb a substantial portion of said fat constituents, and finally transferring the cooked mass from said closed chamber to the atmosphere.

2. The method of treating garbage to provide an edible food product comprising placing in a closed container raw garbage which contains no moisture other than that substantially inherent thereto, initially cooking the garbage within said closed chamber without substantial loss of said inherent moisture and until it is brought to a thick soupy state, continuing the cooking stage in said closed chamber until the internal pressure set up by the inherent moisture is sufficient to produce complete sterilization without substantial vitamin destruction, retaining within the sterilized mass the fat constituents and subjecting the entire mass to heat under vacuum while in said closed chamber until thoroughly cooked, allowing the cooked mass to cool to a temperature below that at which the vitamin content will be affected by the presence of oxygen, during the cooling stage adding a low protein fat absorbent material and causing the last mentioned material to absorb a substantial portion of said fat constituents, and finally transferring the cooked mass from said closed chamber to the atmosphere.

HENRY H. MORETON.